United States Patent
Ho et al.

(10) Patent No.: US 11,955,125 B2
(45) Date of Patent: Apr. 9, 2024

(54) SMART SPEAKER AND OPERATION METHOD THEREOF

(71) Applicant: AmTRAN Technology Co., Ltd., New Taipei (TW)

(72) Inventors: Che-Chia Ho, New Taipei (TW); Chia-Wei Lin, New Taipei (TW)

(73) Assignee: AmTRAN Technology Co., Ltd., New Taipei (TW)

( * ) Notice: Subject to any disclaimer, the term of this patent is extended or adjusted under 35 U.S.C. 154(b) by 104 days.

(21) Appl. No.: 16/653,973

(22) Filed: Oct. 15, 2019

(65) Prior Publication Data

US 2020/0126560 A1 Apr. 23, 2020

(30) Foreign Application Priority Data

Oct. 18, 2018 (TW) .................................. 107136812

(51) Int. Cl.
*G10L 15/26* (2006.01)
*G06F 3/16* (2006.01)

(52) U.S. Cl.
CPC .............. *G10L 15/26* (2013.01); *G06F 3/167* (2013.01)

(58) Field of Classification Search
CPC . G10L 15/00; G10L 15/26; G06F 3/00; G06F 3/167
See application file for complete search history.

(56) References Cited

U.S. PATENT DOCUMENTS

| | | | |
|---|---|---|---|
| 9,967,381 B1 | 5/2018 | Kashimba et al. | |
| 10,083,006 B1* | 9/2018 | Feuz | G06F 40/20 |
| 2012/0245941 A1* | 9/2012 | Cheyer | H04L 63/0861 704/E15.004 |
| 2015/0101066 A1* | 4/2015 | Fram | G06F 21/6245 726/28 |
| 2016/0134635 A1* | 5/2016 | Thelin | H04L 61/1594 726/28 |
| 2017/0025124 A1* | 1/2017 | Mixter | G10L 15/32 |
| 2017/0070537 A1* | 3/2017 | Zhang | H04W 4/029 |
| 2017/0139665 A1* | 5/2017 | Kim | H04L 67/10 |

(Continued)

FOREIGN PATENT DOCUMENTS

| | | |
|---|---|---|
| CN | 102270451 A | 12/2011 |
| CN | 107360507 A | 11/2017 |

(Continued)

*Primary Examiner* — Daniel C Washburn
*Assistant Examiner* — Sean E Serraguard
(74) *Attorney, Agent, or Firm* — CKC & Partners Co., LLC (57) ABSTRACT

The present disclosure provides an operation method of a smart speaker. The method includes steps as follows. The linked settings among voiceprint registration data, user information and a cast setting of a user device are preloaded by the smart speaker. Wake-up words are received to set an operation mode of the smart speaker and to generate a voiceprint recognition result. In the operation mode, after receiving voice, the voice is converted into voice text and the voiceprint recognition result is compared to voiceprint registration data. When the voiceprint recognition result matches the voiceprint registration data, the user information and the voice text are transmitted to a cloud server, so that the cloud server returns the response message to the smart speaker. According to the cast setting, the response message is sent to the user device.

20 Claims, 6 Drawing Sheets

(56) References Cited

U.S. PATENT DOCUMENTS

| | | | |
|---|---|---|---|
| 2017/0242657 A1* | 8/2017 | Jarvis | G10L 17/00 |
| 2017/0243582 A1 | 8/2017 | Menezes et al. | |
| 2018/0285595 A1* | 10/2018 | Jessen | H04L 67/14 |
| 2019/0124049 A1* | 4/2019 | Bradley | H04L 12/2809 |
| 2020/0035241 A1* | 1/2020 | Chang | G10L 15/26 |
| 2020/0257746 A1* | 8/2020 | Gibbon | G06F 16/9535 |

FOREIGN PATENT DOCUMENTS

| | | |
|---|---|---|
| CN | 107609034 A | 1/2018 |
| CN | 107623614 A | 1/2018 |
| CN | 108648760 A | 10/2018 |
| TW | 201716929 A | 5/2017 |

* cited by examiner

SMART SPEAKER AND OPERATION METHOD THEREOF

RELATED APPLICATIONS

This application claims priority to Taiwanese Application Serial Number 107136812, filed Oct. 18, 2018, which is herein incorporated by reference.

BACKGROUND

Field of Invention

The present invention relates to systems and methods. More particularly, the present invention relates to a smart speaker and operation method thereof.

Description of Related Art

The development of artificial intelligence technology has great progress in recent years. Various types of smart speaker products have appeared in the market, wherein most of the smart speaker products provide intelligent conversation interaction, music playback, information search, and other smart functions. Some of the smart speaker products on the market include a display screen, which can display more visual information on the display screen than other products while the voice conversation is being made. For example, when the user asks for the weather information, the screen of the smart speaker product can display the current weather status or a chart of weekly weather status. When a user asks for a specific music, the smart speaker can display the singer or album cover of the identified music. When the user purchases any commodity, the smart speaker can display the picture of the commodity and other information. The smart speaker product without display screen purely uses synthetic voices to answer the user's requests. For product manufacturers, smart speakers with display have higher-standard hardware specifications and requirements, for example, the bills of materials include display panels, touch cells, display drivers, high-capacity memory and storage components for graphic data, graphic processor, and other necessary components which cause much higher costs than no-screen speakers. Therefore, most smart speakers on the market currently do not include a display screen.

The main feature of the smart speaker products is to provide voice assistant service to the users. After receiving the voice request from the user, the smart speaker product uploads the received voice request to the cloud server. After processing the voice request, the cloud server generate message promptly in order to respond to the user, and then the smart speaker products generates the synthesized voice based on the generated message. Because some smart speaker products do not have a display screen and cannot display visualized information relevant to the generated message for responding the user, it takes longer time to generate and play the synthesized voices presenting all the relevant information to the user. In addition, the smart speaker products with display screen can only display graphical information directly to the user. The user still needs to manually transcribe the desired information based on the displayed information. Therefore, the information provided by the voice assistant service cannot be carried with the user conveniently.

SUMMARY

The following presents a simplified summary of the disclosure in order to provide a basic understanding to the reader. This summary is not an extensive overview of the disclosure and it does not identify key/critical components of the present invention or delineate the scope of the present invention. Its sole purpose is to present some concepts disclosed herein in a simplified form as a prelude to the more detailed description that is presented later.

According to embodiments of the present disclosure, the present disclosure provides a smart speaker and an operation method of the smart speaker, to solve or circumvent aforesaid problems and disadvantages in the related art.

An embodiment of the present disclosure is related to a smart speaker including a network device, a processor, a sound playing component, a storage component and a sound receiving device. The processor is configured to preload linked settings among voiceprint data, user information and authority settings corresponding to at least one display device from a storage component. The sound playing component is electrically connected to the processor. The sound receiving component is configured to receive a voice. The processor is configured to convert the received voice into a voice text, recognize a voiceprint of the received voice and the user information of an identified user corresponding to the recognized voiceprint, and transmit the user information of the identified user and the voice text to a cloud server through the network component, wherein the network component is configured to receive a response message from the cloud server and the processor is configured to determine whether to send at least part of the response message to one of the at least one display device through the network component based on the linked settings or the response message.

In one embodiment, the at least one display device includes a user device corresponding to the identified user or an image output device connected to the smart speaker.

In one embodiment, the authority settings corresponding to the at least one display device include a plurality of cast settings of the at least one display device comprising a plurality of content rating or privacy settings.

In one embodiment, the plurality of content rating or privacy settings allow the processor to send the at least part of the response message to the at least one display device through the network component when the content of the at least part of the response message meets the plurality of content rating or privacy settings.

In one embodiment, the user information of the identified user and the voiceprint data of the identified user are registered on the smart speaker.

In one embodiment, a user device corresponding to the identified user is registered on the smart speaker as the at least one display device.

Another embodiment of the present disclosure is related to an operation method of the smart speaker. The operation method includes steps of: receiving a response message in response to a voice text from a cloud server, wherein the voice text is obtained from a voice of a user; obtaining communication information of a display device; determining whether to send a first part of the response message to the display device; and sending the first part of the response message to the display device for displaying.

In one embodiment, the operation method further includes steps of: playing a synthesized voice related to the first part of the response message.

In one embodiment, the operation method further includes steps of: obtaining a set of information based on a second part of the response message; and sending the set of information to the display device for displaying.

In one embodiment, whether to send the first part of the response message to the display device is determined based on a plurality of authority settings corresponding to the display device and a private tag or a content rating tag associated with the first part of the response message.

In one embodiment, the authority settings corresponding to the display device include a plurality of cast settings of the display device comprising a plurality of content rating or privacy settings.

In one embodiment, the display device is a user device corresponding to the user or an image output device connected to the smart speaker.

In one embodiment, the step of obtaining communication information of a display device includes obtaining communication information of a user device corresponding to the user and a plurality of authority settings corresponding to user device corresponding to the user.

In one embodiment, the step of obtaining communication information of a display device comprising: obtaining communication information of an image output device connected to the smart speaker and a plurality of authority settings corresponding to the image out device.

Yet another embodiment of the present disclosure is related to a smart speaker includes a network component and a processor. The network component is configured to receive a message. The processor is connected to the network component. The processor is configured to perform operations for: receiving device information of a display device; receiving authority settings of the display device; and transmitting at least part of the message to the display device for displaying.

In one embodiment, the display device is a user device corresponding to a user registered on the smart speaker or an image output device connected to the smart speaker.

In one embodiment, the authority settings of the display device include a plurality of cast settings comprising a plurality of content rating or privacy settings.

In one embodiment, the smart speaker further includes a sound playing component, electrically connected to the processor, playing a synthesized voice related to the at least part of the message.

In one embodiment, the smart speaker further includes a sound receiving component configured to receive a voice, wherein the processor is configured to convert the received voice into a voice text and transmit the voice text to a cloud server through the network component.

In one embodiment, the network component receives the message from the cloud server in response to the transmitted voice text.

In view of the foregoing, the technical solution provided by the present disclosure exhibits obvious advantages and beneficial effects as compared with conventional techniques. In the present disclosure, the smart speaker does not need a display screen and directly casts the message on the user device for display.

Many of the attendant features will be more readily appreciated, as the same becomes better understood by reference to the following detailed description considered in connection with the accompanying drawings.

BRIEF DESCRIPTION OF THE DRAWINGS

The invention can be more fully understood by reading the following detailed description of the embodiment, with reference made to the accompanying drawings as follows.

DETAILED DESCRIPTION

Reference will now be made in detail to the present embodiments of the invention, examples of which are illustrated in the accompanying drawings. Wherever possible, the same reference numbers are used in the drawings and the description to refer to the same or like parts.

As used in the description herein and throughout the claims that follow, the meaning of "a", "an", and "the" includes reference to the plural unless the context clearly dictates otherwise. Also, as used in the description herein and throughout the claims that follow, the terms "comprise or comprising", "include or including", "have or having", "contain or containing" and the like are to be understood to be open-ended, i.e., to mean including but not limited to. As used in the description herein and throughout the claims that follow, the meaning of "in" includes "in" and "on" unless the context clearly dictates otherwise.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the embodiments. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 1:
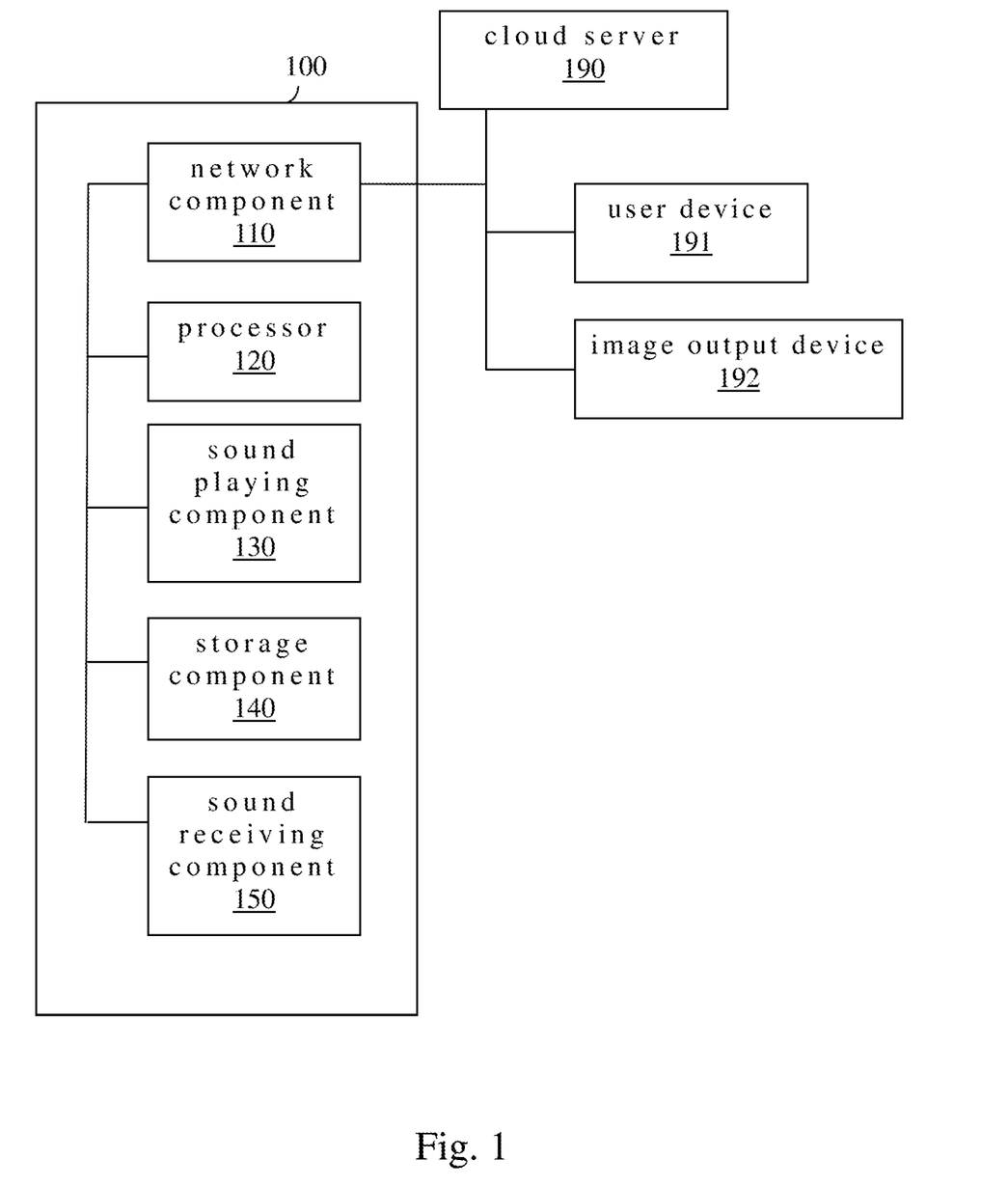
FIG. 1 is a block diagram illustrating a smart speaker according to some embodiments of the present disclosure.

FIG. 1 is a block diagram illustrating a smart speaker 100 according to some embodiments of the present invention. As shown in FIG. 1, the smart speaker 100 and the cloud server 190 are connected through wired and/or wireless network connection. The smart speaker 100 can communicates with a user device 191 and an image output device 192 through wired and/or wireless network communication. For example, the smart speaker 100 has voice assistant software in execution. The cloud server 190 provides an artificial intelligence platform as a cloud processing center of the smart speaker 100. The user device 191 is mobile device, such as a mobile phone, a tablet computer, a notebook computer, or the like. The image output device 192 is a display device, such as a television set, a projector, or the like. The smart speaker 100 and the image output device 192 are usually fixed and disposed somewhere in a room and have connected to each other, but the present invention is not limited thereto. For example, the user can move one of the smart speaker 100 and the image output device 192 to be near the other device, so as to establish wireless or wired connection between the devices.

In FIG. 1, the smart speaker 100 includes a network component 110, a processor 120, a sound playing component 130, a storage component 140, and a sound receiving component 150. In structure, the processor 120 is electrically connected to the network component 110, the sound playing device 130, the storage component 140, and the sound receiving component 150. For example, the network component 110 can be a wired and/or wireless network card or circuit board. The sound playing device 130 can be a loudspeaker driver. The processor 120 can be a central processing unit, a microcontroller or other processing circuit. The storage component 140 can be a hard disk, a flash memory or other storage medium. The sound receiving component 150 can be a microphone.

During operation of the smart speaker 100, the storage component 140 is configured to preload linked settings among voiceprint registration data, user information and settings of casting on the user device 191. When the user speaks the wake-up words to the smart speaker 100, the sound receiving component 150 receives the voice of the wake-up words and provides to the processor 120. The processor 120 then sets the smart speaker 100 into the operation mode based on the recognized wake-up voice and generates a voiceprint recognition result corresponding to the user. When the smart speaker 100 is in the operation mode, the sound receiving component 150 receives the voice from the user and the processor 120 analyzes the received voice and converts the voice into a voice text. The processor 120 also compares the voiceprint recognition result with the voiceprint registration data of users. When the voiceprint recognition result matches the voiceprint registration data of a specific user, the processor 120 transmit the user information of the specific user and the voice text to the cloud server 190 through the network component 110, so that the cloud server 190 can return a corresponding response message to the network component 110. After that, the processor 120 transfers or pushes the response message to the user device 191 through the network component 110 according to the cast settings corresponding to the user device 191 of the specific user, so as to directly cast the response message on the user device 191 for display.

In some embodiments of the present invention, the network component 110 establishes connection with one or more image output devices 192 which have larger display screen than the user device 191. When the cloud server 190 returns a response message to the network component 110, the processor 120 sends the response message to the one or more image output devices 192 through the network component 110 according to the cast settings corresponding to the image output devices 192, so that the response message can be displayed on the image output device 192. In some embodiments of the present invention, the plurality of image output devices 192 can display the same content of the response message synchronously, or display different content portions of the response message respectively according to the cast settings. For example, different charts in the response message can be displayed separately on the image output devices 192. Moreover, different types of contents, such as charts, images or videos, in the response message can be displayed on different image output devices 192 separately. If the response message includes a plurality of audio or audio-containing video contents, such as files, streams, or links to the streams, the image output device 192 with an audio playback device can synchronously play the audio contents of the response message. The image output devices 192 are generally disposed in the public spaces. With the image output devices 192 publicly displaying the contents of the response message, all users near the image output devices 192 can view or perceive the contents of the response message.

In one embodiment, the cloud server 190 is provided with a vocabulary dictionary file or database for recognition. When the cloud server 190 recognizes terms indicating private information, such as possessive adjective "my" before requested information, appeared in the voice text or the corresponding response message according to the vocabulary dictionary file or database, the cloud server 190 will automatically mark the privacy tags to the corresponding privacy information in the corresponding response message. Additionally, when the cloud server 190 recognizes the voice text or the corresponding response message is related to the user's personal information, such as names, accounts, passwords, identity numbers, credit card or health insurance information, the cloud server 190 will automatically mark the private tag in the response message. The response message may include personal bills, health check reports, or other documents which have the personal information of the user within and should not be publicly displayed. Therefore, when the network component 110 establishes communication links with the user device 191 and the image output device 192, the processor 120 can determine whether the response message can be publicly displayed by the image output device 192 or not and send the response message to appropriate connected device for displaying. If the response message returned from the cloud server 190 has the private tag, the processor 120 will only send the response message to the user device 191 through the network component 110 based on the preloaded settings. The processor 120 will not send the response message with private tag to the image output device 192 through the network component 110, so as to prevent the image output device 192 disposed in the public space from displaying the response message including the user's personal privacies. Meanwhile, the smart speaker 100 will generate a synthetic speech based on the response message and the private tag. Parts of the privacy information with the private tag in the response message will be excluded from the generated synthetic speech, so as to avoid revealing personal privacy information.

In one embodiment, the cloud server 190 also automatically marks the content rating tags in the response message after recognizing or receiving the content ratings of the information included in the response message. The storage component 140 preloads linked settings between a authority setting and a cast setting of the image output device 192. After receiving the response message, the processor 120 determines whether the content rating tags of the response message are allowed in the authority settings. When the content rating tag of the information, for example, a link to video suitable for children, in the response message is allowed in the authority settings, for example, the image output device 192 is only prohibited from displaying restricted or adult only contents and allowed to display other contents, the processor 120 will send the information with the content rating tag under authority in response message to the user device 191 and the image output device 192 through the network component 110, so the information with the content rating tag under authority in the response message will be casted directly to the user device 191 and the image output device 192 for displaying. On the other hand, when the content rating tag of the information in the response message is not allowed in the authority settings, the processor 120 will not send the information with the content rating tag without authority in response message to the image output device 192 through the network component 110, so the information with the content rating tag without authority will not be publicly displayed by the image output device 192 in the public area. The processor 120 also determines whether sending the information with the content rating tag in the response message to the user device 191 according to the user information and the cast setting of the user device 191, and the processor only sends information with the content rating tag under authority in the response message through the network component 110 to the user device 191. By this way, the information with the restricted tag or adult only tag may not be displayed on the image output device 192 in public area, but the user may still view the information with the restricted tag or adult only tag on the user device 191 if the authority setting of the user device 191 does not prohibit from displaying the information with such tags.

Please refer to FIGS. 1 to 5 for a more comprehensive understanding of the operation processes performed by the smart speaker 100 in some embodiments of the present invention. Although the figures depict functional steps in a particular sequence for purposes of illustration, the processes are not necessarily limited to the particular order or steps. One skilled in the art will appreciate that the various steps portrayed in these figures can be changed, rearranged, performed in parallel or adapted in various ways. The processes can also be performed in parallel or adapted in various ways in some embodiments of the invention. Furthermore, it is to be understood that certain steps or sequences of steps can be added to or omitted from the processes, without departing from the spirit and scope of the invention.

Figure 2:
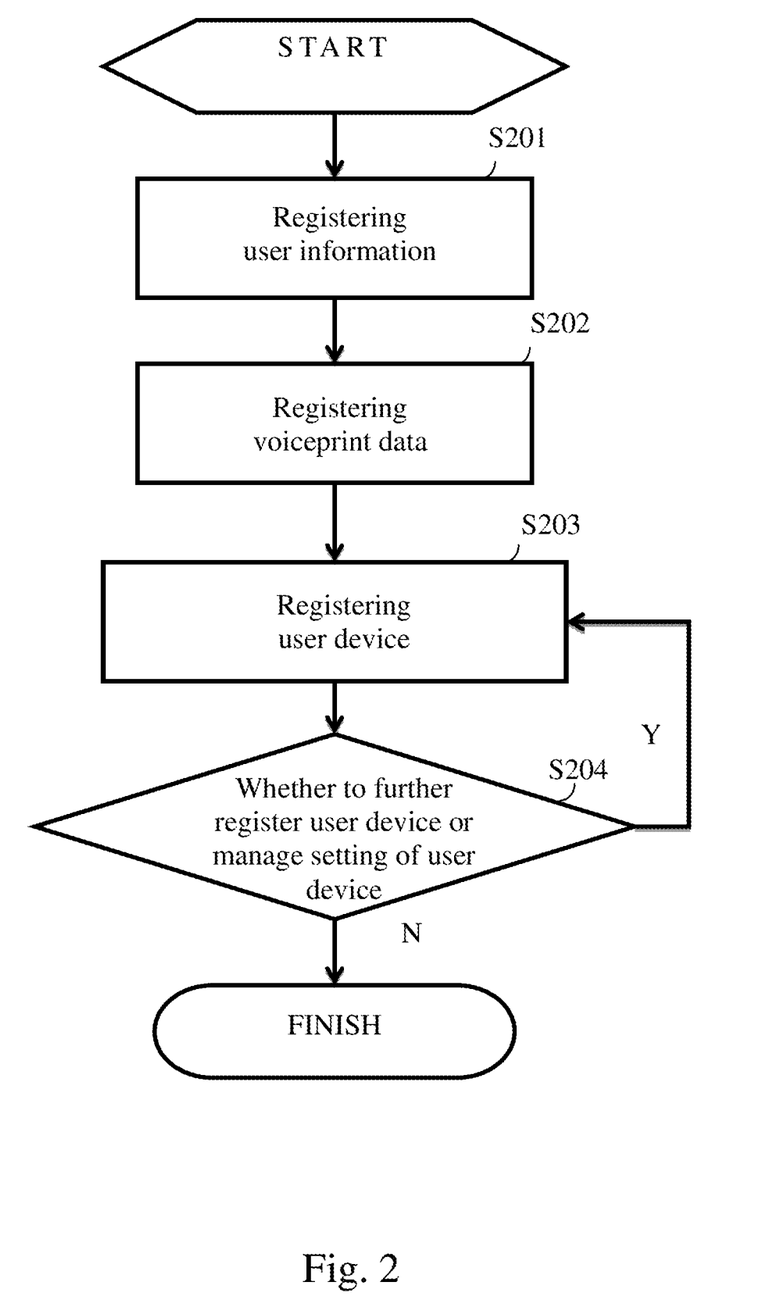
FIG. 2 is a flow chart illustrating the process for registering a user device on the smart speaker according to some embodiments of the present disclosure.

FIG. 2 is a flow chart illustrating the process for registering a user device 191 on the smart speaker 100 according to some embodiments of the present disclosure. As shown in FIG. 2, in step S201, the user registers his or her user information directly through the smart speaker 100 or indirectly through the application software executed by the user device 191, which communicates with the smart speaker 100. The user can initialize the user registration processes by pronouncing keyword to the smart speaker 100 or pushing specific button on the smart speaker 100. During the user registration process, various user information, including the user's name, age, and other personal information, will be recorded. The user can input the user information for registration by various means, including, for example, voice or text input. The administrator of the smart speaker 100 can then decide whether to approve or modify the authorities of the registered user, whether to prohibit the user from modifying his or her authorities, or other authority settings of the registered user. In step S202, the user registers his or her voiceprint data directly on the smart speaker 100 or indirectly through the application software on the user device 191 which connecting the smart speaker 100. During the step of registering voiceprint, the user needs to provide his or her voiceprints by pronouncing specific keywords, so that the smart speaker 100 can analyze characteristics of the voiceprints and record the voiceprints of the keywords. In step S203, the smart speaker 100 performs the user device registration process. During the user device registration process, the smart speaker 100 searches for the user device 191 near the smart speaker 100 for registration and allows the user to set the cast setting of the user device 191 on the smart speaker 100. In one embodiment of the present invention, the smart speaker 100 then lists all the searched devices, and the user can select any of the searched devices to be registered as the user device binding to his or her user information. In one embodiment of the present invention, after the user selects the user device 191, the smart speaker 100 sends the confirmation request with information of the user device 191 to the user device 191, which ask the user to confirm binding the user device 191 to him or her. The user can then answer the smart speaker 100 through the voice or the application software on the user device 191, thereby confirming that the device is registered as belonging to the user. In one embodiment of the present invention, the user uses the application software of the user device 191, which connects to the smart speaker 100, to register the user device 191 on the smart speaker 100. During the process of device registration, the user provides voice to the smart speaker 100 for comparing the provided voice with the registered voiceprint. In this manner, the smart speaker 100 registers the user device 191 as belonging to the user providing the voiceprint if the provided voice matches the registered voiceprint. In one embodiment of the present invention, the user or the administrator of the smart speaker 100 can use the application software on his or her user device to connect the smart speaker 100, so as to manage the cast settings corresponding to the registered user device 191. In one embodiment of the present invention, the user or the administrator of the smart speaker 100 can further manage authorities corresponding to the registered user device 191 besides the authorities corresponding to the user. Specifically, the authority settings corresponding to the registered user device 191 may not only include the authority settings of receiving or displaying contents with certain content ratings, but also the authority settings that the user device 191 may have different authorities of receiving or displaying certain contents in different time periods, the password settings which allow the user device 191 to open or display different types of contents or data, and/or settings or authorities of other smart speaker related functions. In step S204, it is determined whether the user wants to further register user device or manage settings of any user device. If the user wants to register or manage the settings of another user device, the step S203 is repeatedly executed as above. If the user does not need to set or register another user device, the registration process is finished thereby. Thereafter, the storage component 140 of the smart speaker 100 will load the updated linked settings among updated voiceprint registration data, user information, and device registration information and cast settings of the user device 191. In one embodiment of the present invention, besides to register the user device during the user registration process, the user can particularly activate the user device registration sub-process to register a new user device or modify the registration information and the cast settings of the registered user device. The user may pronounce specific keywords or utilize the application software on the user device 191 at any time in order to activate the user device registration sub-process.

Figure 3:
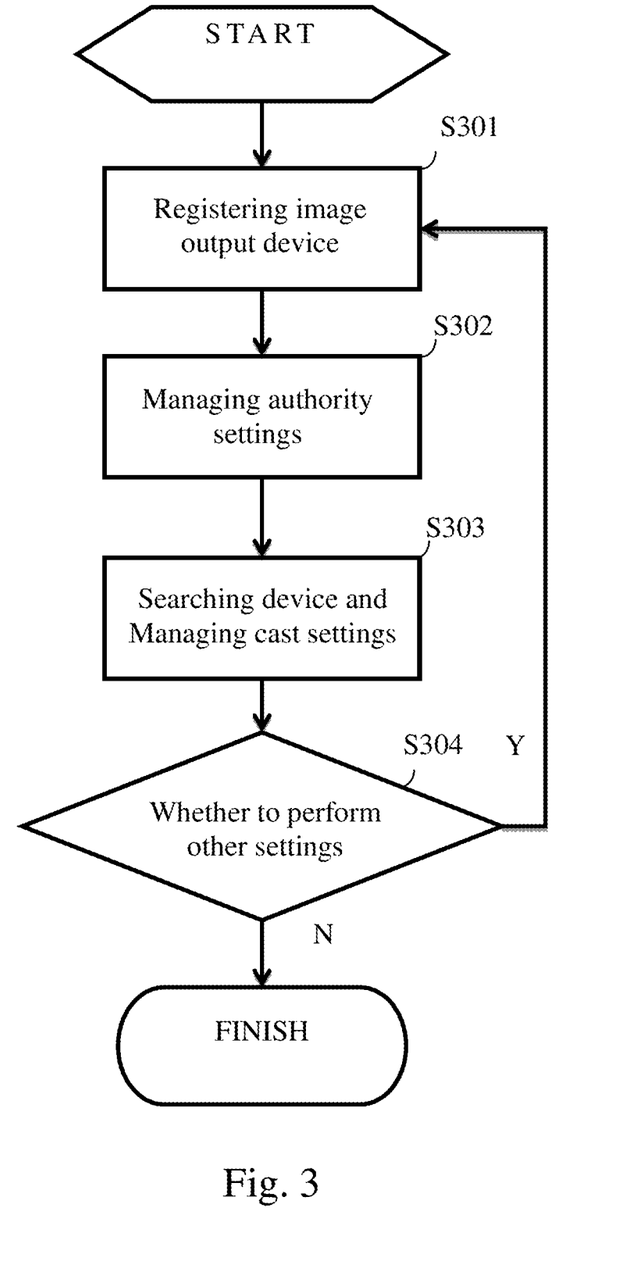
FIG. 3 is a flow chart illustrating the process for registering the image output device on the smart speaker according to some embodiments of the present disclosure.

FIG. 3 is a flow chart illustrating the process for registering the image output device 192 on the smart speaker 100 according to some embodiments of the present disclosure. As shown in FIG. 3, the image output device registration sub-process is activated in step S301 in order to register a new image output device or modify the registration information and the cast settings of the registered image output device. The user may directly use the smart speaker 100 or indirectly use the application software on the user device 191 or the image output device 192, which connects to the smart speaker 100, so as to activate the image output device registration sub-process. In one embodiment of the present invention, the user can input in the information or the search criteria of the image output device 192 to be registered at this step, such as the location, the brand of the device, the device type, the model number and other related information, so the smart speaker 100 can find the image output device 192 based on the inputted information or the search criteria. In step S302, the user sets the authority settings of the image output device 192 on the smart speaker 100. For example, the user sets whether the image output device 192 is allowed to display the image contents with the restricted ratings or the parental guidance suggested ratings, whether the image output device 192 is allowed to display the privacy information, and/or other smart speaker or casting related authorities. Specifically, to the authorities of the image output device 192 not only include the authorities of receiving or displaying contents with different content ratings or privacy types, but also the settings that image output device 192 may have different authorities in different time periods, the password settings which allow the image output device 192 to open or display different types of data, and/or settings or authorities of other smart speaker related functions. In step S303, the smart speaker 100 searches for the image output device 192 around the smart speaker 100 and manage the cast settings of the image output device 192. In one embodiment of the present invention, the smart speaker 100 searches for the device with the inputted information or the search criteria of the image output device 192. After the image output device 192 is found, the device information and the authority settings are bound to the found image output device 192 in the data structure of smart speaker 100. In one embodiment, after the user completes the authority settings of the image output device 192 in step S302, the smart speaker 100 or the application software asks the user whether to apply the same authority settings to all the image output devices around the smart speaker 100. If the user agrees, the smart speaker 100 will then search for all the image output devices around the smart speaker 100 and sets all the image output devices with the same authority settings. If the user does not agree to apply the same authority settings to all the image output devices around the smart speaker 100, the smart speaker 100 or application software prompts the user to select any of the found image output devices for respectively managing authority settings of the selected image output device. In step S304, the user decides whether or not to perform other settings on the smart speaker 100. If there is another image output device required to be registered, the process returns to step S301. Conversely, if there is no other image output device required to be registered, the process ends thereby. Thereafter, the storage component 140 preloads the linked settings between the updated authority settings and the cast settings of the image output device 192 for further operations. In one embodiment of the present invention, the administrator of the smart speaker 100 can decide whether to approve or modify the registration and the authority settings of the image output device 192, whether to prohibit specific user from modifying the authority settings of specific registered image output device, or other administration operations.

In one embodiment of the present invention, the user may directly pronounce keywords to the smart speaker 100 or indirectly uses the application software on the user device 191 or the image output device 192 to activate the device search sub-process. During the device search sub-process, the smart speaker 100 searches for any image output devices around the smart speaker 100, and then the smart speaker 100 or application software provides the information of founded image output devices to the user and prompts the user to select one of the founded image output devices for modifying authority settings or inputting the device information of the selected image output device. When the user completes aforesaid settings modification or information input operation, the smart speaker 100 stores the modified settings or inputted information and binds the modified settings or inputted information with the image output device selected by the user. For example, the original settings or information of the selected image output device is overlapped, replaced, or updated by the modified settings or inputted information. Then the storage component 140 preloads the new linked settings between the updated authority settings and the cast settings of the image output device 192 for further operations.

Figure 4:
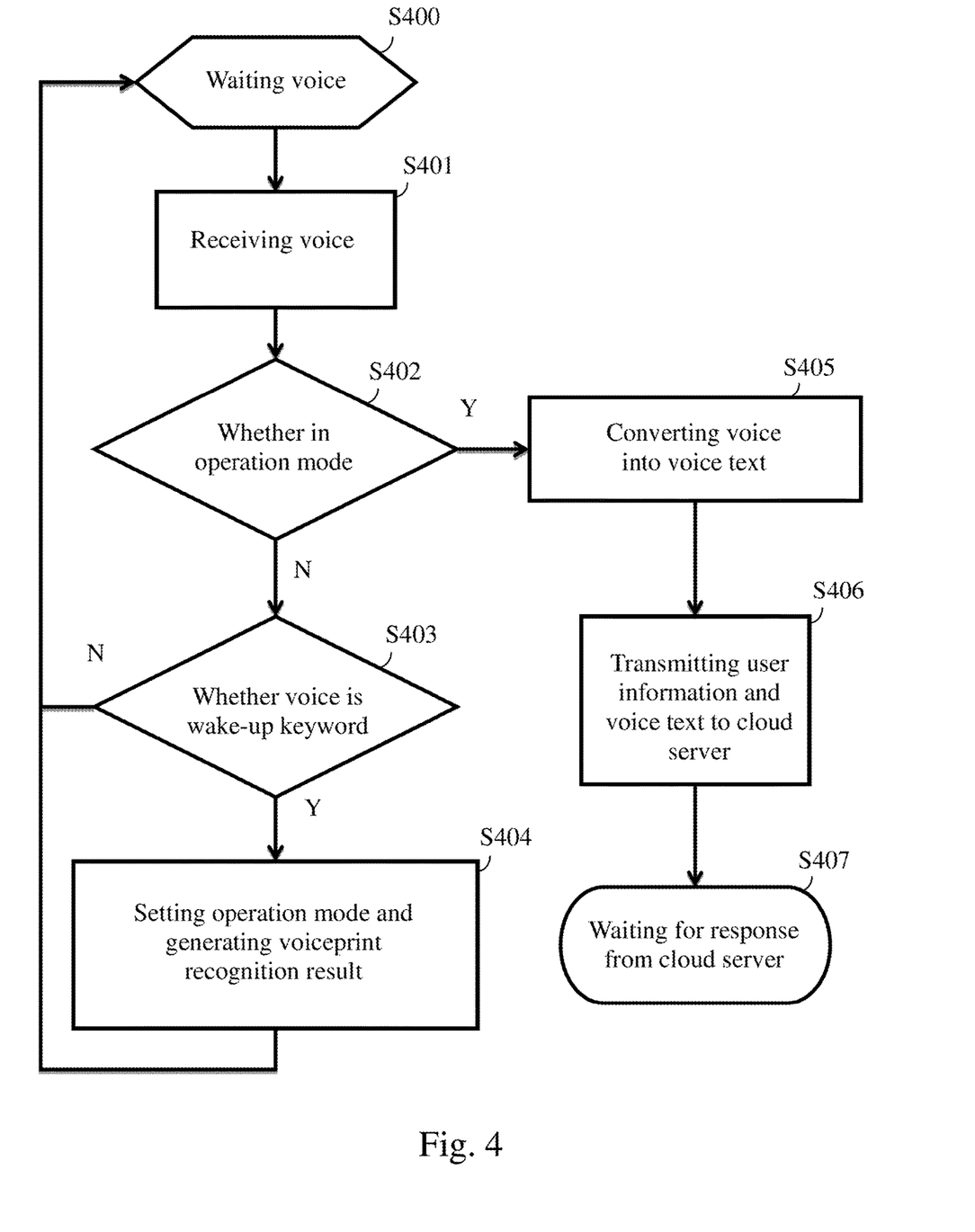
FIG. 4 is a flow chart illustrating the process of the smart speaker receiving and processing an user's voice according to some embodiments of the present disclosure.

FIG. 4 is a flow chart illustrating the process of the smart speaker 100 receiving and processing the user's voice according to some embodiments of the present disclosure. As shown in FIG. 4, firstly the smart speaker 100 waits for a voice from the user in step S400. In step S401, the user speaks the voice to the smart speaker 100, and then that the sound receiving component 150 receives the voice. In step S402, the processor 120 determines whether the smart speaker 100 is already in the operation mode. If the smart speaker 100 is in a standby mode or not in the operation mode, the processor 120 determines whether the voice is a wake-up keyword in step S403. If the voice is the wake-up keyword, the processor 120 sets the smart speaker 100 to enter into the operation mode and analyzes the voice to generate the voiceprint recognition result in step S404. If the voiceprint recognition result matches the voiceprint registration data of a registered user, the processor 120 acquires the user information of the registered user, the cast settings of the user device 191 corresponding to the registered user, the authority settings of the registered user and the corresponding user device 191, the cast settings of the image output device 192, and other related information and settings from the storage component 140. Then, the processes returns to step S400 to wait for the next voice from the user.

Moreover, in the smart speaker 100 which is in the operation mode, the processor 120 converts the voice into the voice text as illustrated in step S405 after the sound receiving component 150 receives the voice from the user. In step S406, the processor 120 transmits the user information and the voice text to the cloud server 190 through the network component 110. Then, in step S407, the smart speaker 100 waits for the response from the cloud server 190. In one embodiment of the present invention, smart speaker 100 which is in the operation mode, the processor 120 further recognizes the voiceprint of a whole or a part of the received voice after the sound receiving component 150 receives the voice from the user. In one embodiment of the present invention, the processor 120 determines whether the recognized voiceprint of the received voice matches the recognized voiceprint of the previously received wake-up voice and both belong to the same user, so as, to confirm that the user who provides the uploaded voice text matches the user information provided with the uploaded voice text. If the recognized voiceprint of the received voice does not match the recognized voiceprint of the previously received wake-up voice, the processor 120 will compare the recognized voiceprint of the received voice with the other voiceprints of the registered users so as to find a match. If a matched user cannot be found, the smart speaker 100 will only upload the voice text to the cloud server 190 with no user information. In one embodiment of the present invention, if the processor 120 determines that the recognized voiceprint of the received voice does not match the recognized voiceprint of the previously received wake-up voice, the smart speaker 100 will uploads the voice text without any user information directly and will not perform further comparison with other registered user's voiceprints. In one embodiment of the present invention, if the processor 120 determines that the recognized voiceprint of the received voice does not match the recognized voiceprint of the previously received wake-up voice, the smart speaker 100 plays a synthesized voice notifying any user around the smart speaker 100 that the voice of unidentified person, such as an unregistered user, is received. The smart speaker 100 also asks any registered user around the smart speaker 100 whether to process the received voice of the unidentified person or upload the received voice of the unidentified person to the cloud server 190 for processing.

Figure 5:
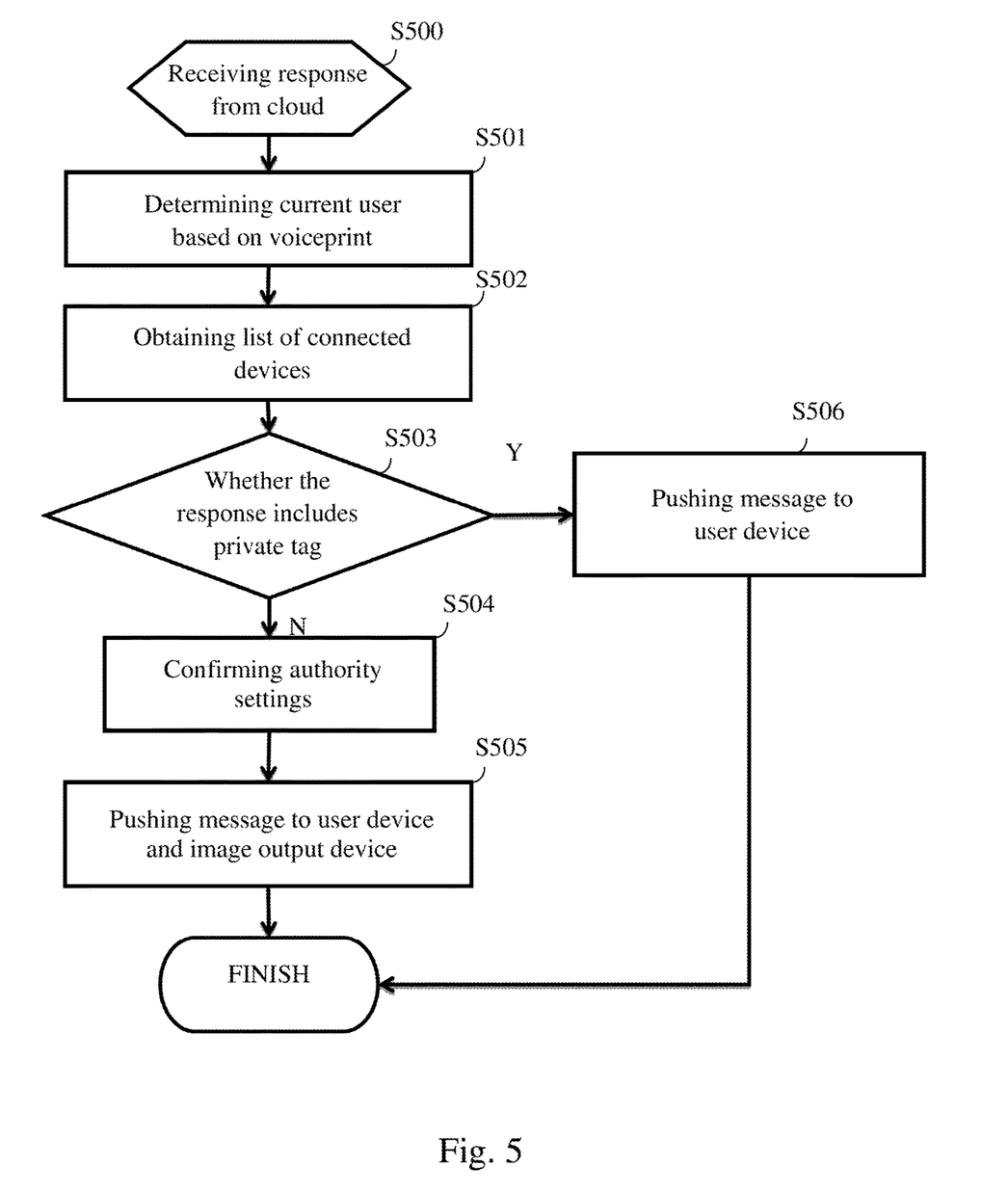
FIG. 5 is a flow chart illustrating process of the smart speaker casting response messages corresponding to the user's voice input according to some embodiments of the present disclosure.

FIG. 5 is a flow chart illustrating process of the smart speaker 100 casting response messages corresponding to the user's voice input according to some embodiments of the present disclosure. As shown in FIG. 5, in step S500, the smart speaker 100 receives the response message from the cloud server 190. The cloud server 190 previously receives the voice text converted from the voice of the user received by the smart speaker 100, performs semantic recognition on the voice text, and then processes and collects semantic related information according to the semantics or the user information from the smart speaker 100. Eventually the cloud server 190 generates and returns the response message responding the voice of the user to the smart speaker 100. In one embodiment of the present invention, the contents of the response messages may include processing instructions, synthesized speech texts, data contents, information tags, content rating tags, other data authority tags, and other types of information. In step S501, the processor 120 determines whether to push the response message to a user device 191 based on the contents of the response message and preloaded the cast settings. If the processor 120 determines that the response message should be pushed to a user device, the processor 120 will then determines which user's user device 191 should receive the response message based on the recognized voiceprint of the previously received voice, which the response message is responding to. In step S502, the smart speaker 100 obtains the list of connected devices. In one embodiment of the present invention, the smart speaker 100 establishes communications with the user device 191 and the image output device 192, and the list of connected devices includes information of the user device 191 and the image output device 192 having communications with the smart speaker 100. In one embodiment of the present invention, the smart speaker 100 shares the same wireless network with the user device 191 or the image output device 192. For example, the smart speaker 100, the user device 191 and the image output device 192 are connected to the same wireless access point, base station or other wireless network equipment. In one embodiment of the present invention, the smart speaker 100 can be directly or indirectly connected to the user device 191 or the image output device 192. For example, the user device 191 or the image output device 192 can be directly connected to the smart speaker 100 through wired or wireless network communication. In another embodiment of the present invention, both of the smart speaker 100 and the user device 191 may connect to the image output device 192, which works as a network node, and the smart speaker 100 can obtain a list of devices connected to the image output device 192. In this way, the smart speaker 100 can find the user device 191 of the user, who provides the voice to the smart speaker 100, in the list of the devices connected to the image output device 192. In other words, the smart speaker 100 may connect to another network device and obtain the list of other devices connected to the network device, so the scope of the aforementioned list of connected devices is expanded. In one embodiment of the present invention, the smart speaker 100 connects the user device 191 or the image output device 192 through Internet. The smart speaker 100 can search and find the user device 191 or the image output device 192 on the Internet according to the device registration information. In step S503, the processor 120 determines whether the response message from the cloud server 190 has the private tag. If the response message from the cloud server 190 has the private tag, the processor 120 will only send the response message to the user device through the network component 120 step S506, and the image output device 191 will not receive the response message with the private tag. Therefore, the image output devices 192 generally disposed in public areas will not display the response messages involving private contents. In one embodiment of the present invention, the processor 120 will determine whether the response message with the private tag can be displayed by the image output device 191. If the authority settings and cast settings of the image output device 191 are allowed to display the response message with the private tag, the processor 120 will push the response message to the image output device 191 for displaying. In this way, the image output device 191 in a secured or private space can display the response message on screen.

In one embodiment of the present invention, the smart speaker 100 performs processes according to the content of the response message after receiving the response message from the cloud server 190. For example, the smart speaker 100 may execute the processing commands and instructions received from the cloud server 190, generate the synthesized voices according to the synthesized voice texts, or search for requested information in the storage component 140 or through the network. The smart speaker eventually will generate a synthesized voice reply message and a data reply message accordingly. The smart speaker 100 will play the synthesized voice which speaks the synthesized voice reply message, and push the data reply message to the user device 191 or the image output device 192 following the determination results. In one embodiment of the present invention, the synthesized voice reply message includes a reminder notifying that the user data response message has been pushed to the user device 191 or the image output device 192. In one embodiment of the present invention, the processor 120 determines whether the synthesized voice reply message or the data reply message has the private tag or private information. The private tag or private information may be part of the data contents collected by the cloud server 190 or the processor 120 of the smart speaker 100, or the private tag or private information is generated, retrieved, or included in the synthesized voice reply message or the data reply message by the cloud server 190 or the processor 120 of smart speaker 100 after analyzing the collected data contents. Accordingly, the processor 120 determines whether to recite a whole of the synthesized voice reply message, only to recite a part of the synthesized voice reply message, or to inhibit from reciting the synthesized voice reply message in the synthesized voice to be played by the smart speaker 100. Moreover, the processor 120 determines whether to push the data reply message to the user device 191 and the image output device 192, or only push the data reply message to the user device 191, so as to prevent private information from being publicly disclosed.

In step S504, the processor 120 determines whether the content rating and/or other data authority tags of the response message are allowed in the authority settings of the user, the user device 191 or the image output device 192 after the response message is determined as having no private tag. In step S505, if the content rating or other data authority tags of the response message are allowed in the authority settings, the processor 120 pushes the response message to the user device 191 and the image output device 192 through the network component 110. If the content rating or other content authority tags of the response message are not allowed in the authority settings, the response message is not pushed to the user device 191 and the image output device 192. In another embodiment of the present invention, the processor 120 can divide the contents of the response message in parts and only push the parts of the contents in the response message which are allowed in the authority settings. In one embodiment of the present invention, the processor 120 pushes different content parts of the response message to the user device 191 and the image output device 192 respectively according to the comparison result of the content rating and other data authority tags with the authority and casting settings. For example, if a part of contents which is not allowed in the authority settings of the image output device 192 but is allowed in the authority settings of the user device 191, the processor 120 will push the part of the contents to the user device 191 rather than the image output device 192, or vice versa. After determining that there is at least part of contents that is not allowed in the authority or casting settings, the smart speaker 100 may play a synthesized voice notifying the user that some of the retrieved contents are not allowed in the settings. The smart speaker 100 may also record the retrieved contents which are not allowed and above-mentioned voice text from the user, which result in the collection of the contents, in logs, so the administrator of the smart speaker 100 can query or check.

In one embodiment of the present invention, the response message from the cloud server 190 does not have the private, content rating, or other data authority tag. In this case, after the smart speaker 100 receives the response message from the cloud server 190, the processor 120 performs processes of analyzing the contents of the response message. For example, the smart speaker 100 executes the processing commands and instructions retrieved from the cloud server 190, generates the synthesized voice according to the synthesized voice texts, or searches for requested information in the storage component 140 or through the network. Meanwhile, the processor 120 of the smart speaker 100 determines whether the requested information or contents, collected based on the voice request and the response message, has private, content rating, and other data authority tags. In another embodiment of the present invention, the processor 120 analyzes the collected information or contents in order to determine whether to add the private, content rating, or other data authority tag to the collected information or contents. Afterwards, the processor 120 will eventually generate the synthesized voice reply message and the data reply message based on the response message, and collected information and contents. If the processor 120 determines that the collected information or contents have the private tag, the data reply message with the private information or contents will be pushed to the user device 191 only, so the image output device 192 will not display the private information or contents. In one embodiment of the present invention, the synthesized voice reply message includes a reminder notifying that the data reply message has been pushed to the user device 191, or notifying that the private information of the user is prohibited from being publicly displayed or read out. If the processor 120 determines that the collected information or contents have the content rating or other data authority tags, the processor 120 will divide the collected information or contents into different message parts with different tags separately and push different message parts to the user device 191 and the image output device 192 respectively based on the comparison result of the content rating and data authority tags with the authority and casting settings of the user device 191 and the image output device 192. If part of the collected information or contents has the data authority tags not allowed in the authority settings of the user device 191 or the image output device 192, the smart speaker 100 will not push the part of the collected information or contents to the device with authority settings which prohibit such part of the collected information or contents. In addition, the smart speaker 100 will play the synthesized voice notifying the user that the information prohibited by the authority settings cannot be displayed. In one embodiment of the present invention, the smart speaker 100 will record such part of the collected information or contents and above-mentioned voice text of the voice request from the user in logs, so the administrator of the smart speaker 100 can query or check.

In one embodiment of the present invention, if the response message from the cloud server 190 or the data reply message generated by the smart speaker 100 has the private tag, the processor 120 will still determine whether the response message or the data reply message has any data authority tag, and if there is data authority tag found in the response message or the data reply message, the processor 120 will determine whether the data authority tag is allowed in the authority settings of the user, the user device 191 or the image output device 192. In one embodiment of the present invention, the user can temporarily set the usage status of the user device 191 by utilizing the application software, such as being used in public space or being used by a minor. The application software will immediately update the cast settings or the authority settings, such that the information or content with private or adult only tag will be prohibited from displaying, until the authorized user changes the usage status of the user device 191.

Figure 6:
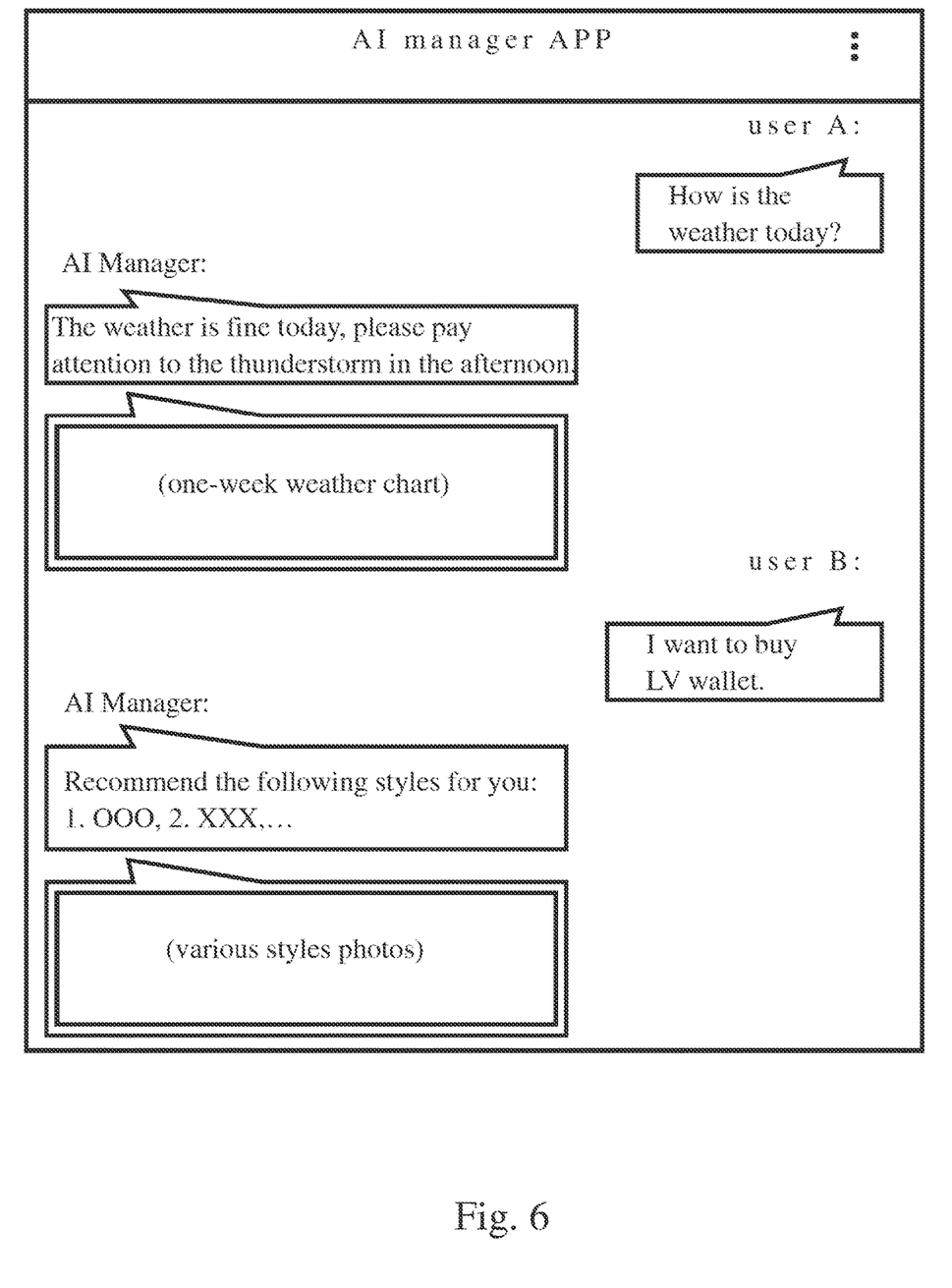
FIG. 6 is a schematic diagram illustrating a device-side application according to some embodiments of the present disclosure.

FIG. 6 is a drawing illustrating the graphical user interface of the application software on the user device 191 or the image output device 192 according to some embodiments of the present disclosure. In one embodiment of the present invention, the user device 191 and/or the image output device 192 can display the voice text converted from the voice and the response messages, such as the requests from user A and B and the answer of the AI manager software in FIG. 6, in the form of dialogue logs. The artificial intelligence (AI) manager application (APP) on the smart speaker 100 or the application software on the user device 191 or the image output device 192 can perform the voice-to-text conversions in real time. In this way, the AI manager or the application software will automatically record the dialogue and the user can query current question, request, answer, or the history of the dialogue in the dialogue logs at any time. The response messages from the AI manager APP on the smart speaker 100 can contain various types of information, including voice text, information forms, pictures, images, videos, audio, links or other types of data, are shown in the graphical user interface of the application software. In one embodiment of the present invention, the application software records various types of information or contents and show the recorded information or contents in the dialogue logs. The application software will open, display or play part of the information or contents in the user interface in response to the user's clicking or sliding operation on the recorded information or contents shown in the user interface.

In view of the foregoing, the technical solution provided by the present disclosure exhibits obvious advantages and beneficial effects as compared with conventional techniques. In the present disclosure, the smart speaker 100 does not need a display screen and can directly cast the graphical message on the user device 191 and/or the image output device 192 for viewing. Even if the smart display 100 has a display screen, the graphical message can still be casted on the user device 191 and/or the image output device 192 for viewing and storage. Therefore, the user can carry the user device 191, such as a mobile device, with the message conveniently, and the graphical message can be shown to others on a larger display screen of the image output device.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A smart speaker, comprising:
a network component;
a processor configured to preload linked settings among voiceprint data of a plurality of registered users, user information of each of the registered users and authority settings corresponding to a plurality of registered display devices from a storage component, wherein the plurality of registered display devices are not part of the smart speaker, and the plurality of registered display devices comprises a user device corresponding to one of the registered users and an image output device;
a sound playing component electrically connected to the processor; and
a sound receiving component configured to receive a voice;
wherein the processor is configured to convert the received voice into a voice text, recognize a voiceprint of the received voice among the voiceprint data of the registered users, identify the specific user information of the one of the registered users corresponding to the recognized voiceprint, and transmit the specific user information and the voice text to a cloud server through the network component, wherein the voice text does not indicate any of the registered display devices and the network component is configured to receive a response message in response to the voice text from the cloud server and the processor is configured to determine whether to send at least part of the response message to one of the registered display devices through the network component based on the linked settings and a privacy tag or a content rating tag of the response message;
wherein the authority settings corresponding to the registered display devices include a plurality of cast settings corresponding to the registered display devices respectively, wherein the authority settings and cast settings corresponding to the image output device comprise a plurality of content rating or privacy setting to restrict the response message with privacy tag or the content rating tag to be displayed on the image output device,
wherein the smart speaker generates a synthesized voice reply message and a data reply message according to content of the response message, if the synthesized voice reply message or the data reply message includes the privacy tag, the processor determines the synthesized voice reply message not to be played by the sound playing component, the processor determines to push the data reply message only to the user device corresponding to the one of the registered users through the network component, and the processor determines not to push the data reply message to the image output device through the network component, and
if the synthesized voice reply message or the data reply message does not include the privacy tag, the processor determines the synthesized voice reply message be played by the sound playing component.

2. The smart speaker of claim 1, wherein the plurality of content rating or privacy settings allow the processor to send the at least part of the response message to the user device and the image output device through the network component when the content of the at least part of the response message meets the plurality of content rating or privacy settings.

3. The smart speaker of claim 1, wherein the user information of the each of the registered users and the voiceprint data of the each of the registered users are registered on the smart speaker.

4. The smart speaker of claim 3, wherein the user device corresponding to the one of the registered users is registered on the smart speaker as the registered display device.

5. The smart speaker of claim 1, wherein if the synthesized voice reply message or the data reply message includes the privacy tag, the synthesized voice reply message includes a reminder notifying that the data reply message has been pushed to the user device.

6. The smart speaker of claim 1, wherein if the synthesized voice reply message or the data reply message includes the privacy tag, the synthesized voice reply message includes a reminder notifying that the data reply message is prohibited from being publicly displayed or read out.

7. The smart speaker of claim 1, wherein the processor is configured to execute a registration process to register the voiceprint data of the plurality of registered users and the plurality of registered display devices, the one of the registered users registers voiceprint data directly on the smart speaker or indirectly through application software on the user device which connecting the smart speaker, and the smart speaker searches for the user device or the image output device for registration and authority settings.

8. The smart speaker of claim 1, wherein smart speaker provides at least the voice texts from the received voices of the registered users and the synthesized voice reply messages to the image output device or the user device corresponding to the one of the registered users in a form of dialogue logs between the smart speaker and the registered users.

9. A smart speaker, comprising:
a network component;
a processor configured to preload linked settings among voiceprint data of a plurality of registered users, user information of each of the registered users and authority settings corresponding to a plurality of registered display devices from a storage component, wherein the plurality of registered display devices are not part of the smart speaker, and the plurality of registered display devices comprises a user device corresponding to one of the registered users and an image output device;
a sound playing component electrically connected to the processor; and
a sound receiving component configured to receive a voice;
wherein the processor is configured to execute a registration process to register the voiceprint data of the plurality of registered users and the plurality of registered display devices, the one of the registered users registers voiceprint data directly on the smart speaker or indirectly through application software on the user device which connecting the smart speaker, and the smart speaker searches for the user device or the image output device for registration and authority settings;
wherein the processor is configured to convert the received voice into a voice text, recognize a voiceprint of the received voice among the voiceprint data of the registered users, identify the specific user information of the one of the registered users corresponding to the recognized voiceprint, and transmit the specific user information and the voice text to a cloud server through the network component, wherein the voice text does not indicate any of the registered display devices and the network component is configured to receive a response message in response to the voice text from the cloud server and the processor is configured to determine whether to send at least part of the response message to one of the registered display devices through the network component based on the linked settings and a privacy tag or a content rating tag of the response message;
wherein the authority settings corresponding to the registered display devices include a plurality of cast settings corresponding to the registered display devices respectively, wherein the authority settings and cast settings corresponding to the image output device comprise a plurality of content rating or privacy setting to restrict the response message with privacy tag or the content rating tag to be displayed on the image output device,
wherein the smart speaker generates a synthesized voice reply message and a data reply message according to content of the response message, the processor determines whether to play the synthesized voice reply message by the sound playing component, the processor determines to push the data reply message to the user device corresponding to the one of the registered users through the network component, and the processor determines whether to push the data reply message to the image output device through the network component.

10. The smart speaker of claim 9, wherein if the synthesized voice reply message or the data reply message includes the privacy tag, the processor determines the synthesized voice reply message not to be played by the sound playing component and to push the data reply message only to the user device corresponding to the one of the registered users through the network component.

11. The smart speaker of claim 10, wherein if the synthesized voice reply message or the data reply message includes the privacy tag, the synthesized voice reply message includes a reminder notifying that the data reply message has been pushed to the user device.

12. The smart speaker of claim 10, wherein if the synthesized voice reply message or the data reply message includes the privacy tag, the synthesized voice reply message includes a reminder notifying that the data reply message is prohibited from being publicly displayed or read out.

13. The smart speaker of claim 10, wherein the plurality of content rating or privacy settings allow the processor to send the at least part of the response message to the user device and the image output device through the network component when the content of the at least part of the response message meets the plurality of content rating or privacy settings.

14. The smart speaker of claim 9, wherein smart speaker provides at least the voice texts from the received voices of the registered users and the synthesized voice reply messages to the image output device or the user device corresponding to the one of the registered users in a form of dialogue logs between the smart speaker and the registered users.

15. A smart speaker, comprising:
a network component;
a processor configured to preload linked settings among voiceprint data of a plurality of registered users, user information of each of the registered users and authority settings corresponding to a plurality of registered display devices from a storage component, wherein the plurality of registered display devices are not part of the smart speaker, and the plurality of registered display devices comprises a user device corresponding to one of the registered users and an image output device;
a sound playing component electrically connected to the processor; and
a sound receiving component configured to receive voices of the registered users;
wherein the processor is configured to convert the received voice into voice texts, recognize voiceprints of the received voices among the voiceprint data of the registered users, identify user information of the registered users corresponding to the recognized voiceprints, and transmit the user information and the voice texts to a cloud server through the network component, wherein the voice texts do not indicate any of the registered display devices and the network component is configured to receive response messages in response to the voice texts from the cloud server and the processor is configured to determine whether to send at least part of the response messages to one of the registered display devices through the network component based on the linked settings and a privacy tag or a content rating tag of the response messages;
wherein the authority settings corresponding to the registered display devices include a plurality of cast settings corresponding to the registered display devices respectively, wherein the authority settings and cast settings corresponding to the image output device comprise a plurality of content rating or privacy setting to restrict the response message with privacy tag or the content rating tag to be displayed on the image output device, wherein the smart speaker generates synthesized voice reply messages and data reply messages according to content of the response messages, the processor determines whether to play the synthesized voice reply messages by the sound playing component, the processor determines to push the data reply messages to the user device corresponding to the one of the registered users through the network component, and the processor determines whether to push the data reply messages to the image output device through the network component, wherein smart speaker provides at least the voice texts from the received voices of the registered users and the synthesized voice reply messages to the image output device or the user device corresponding to the one of the registered users in a form of dialogue logs between the smart speaker and the registered users.

16. The smart speaker of claim 15, wherein if the synthesized voice reply message or the data reply message includes the privacy tag, the processor determines the synthesized voice reply message not to be played by the sound playing component and to push the data reply message only to the user device corresponding to the one of the registered users through the network component.

17. The smart speaker of claim 16, wherein if the synthesized voice reply message or the data reply message includes the privacy tag, the synthesized voice reply message includes a reminder notifying that the data reply message has been pushed to the user device.

18. The smart speaker of claim 16, wherein if the synthesized voice reply message or the data reply message includes the privacy tag, the synthesized voice reply message includes a reminder notifying that the data reply message is prohibited from being publicly displayed or read out.

19. The smart speaker of claim 15, wherein the plurality of content rating or privacy settings allow the processor to send the at least part of the response message to the user device and the image output device through the network component when the content of the at least part of the response message meets the plurality of content rating or privacy settings.

20. The smart speaker of claim 15, wherein the processor is configured to execute a registration process to register the voiceprint data of the plurality of registered users and the plurality of registered display devices, the one of the registered users registers voiceprint data directly on the smart speaker or indirectly through application software on the user device which connecting the smart speaker, and the smart speaker searches for the user device or the image output device for registration and authority settings.

* * * * *